US011431192B2

(12) United States Patent
Phillips

(10) Patent No.: US 11,431,192 B2
(45) Date of Patent: Aug. 30, 2022

(54) SPLIT-BUS ELECTRICAL PANEL IN PARALLEL CONFIGURATION TO MAXIMIZE PV/BATTERY INVERTER BACK-FEED POWER

(71) Applicant: Schneider Electric USA, Inc., Andover, MA (US)

(72) Inventor: Timothy Phillips, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/201,553

(22) Filed: Mar. 15, 2021

(65) Prior Publication Data
US 2022/0123586 A1    Apr. 21, 2022

Related U.S. Application Data

(60) Provisional application No. 63/093,920, filed on Oct. 20, 2020.

(51) Int. Cl.
*H02J 9/06* (2006.01)
*H02J 7/35* (2006.01)

(52) U.S. Cl.
CPC ............... *H02J 9/062* (2013.01); *H02J 7/35* (2013.01)

(58) Field of Classification Search
CPC .................................. H02J 9/062; H02J 7/35
See application file for complete search history.

(56) References Cited

U.S. PATENT DOCUMENTS

2020/0020050 A1*    1/2020  Bazhinov .............. G05B 15/02

* cited by examiner

*Primary Examiner* — Toan T Vu
(74) *Attorney, Agent, or Firm* — Locke Lord LLP

(57) ABSTRACT

An apparatus provides a single split-bus electrical panel with back-feed circuit breakers arranged and sized so that, for example, a single 225A rated split-bus electrical panel with a 200A main breaker may be used to connect a far higher photovoltaic power source than conventional configurations. The circuit breakers are connected to a Microgrid Interconnection Device for isolation of critical loads during a utility power outage. A first panel section of the split-bus panel is connected to a utility and supplies power to non-critical loads. A second panel section is connected to a renewable power source with battery back-up to supply power to the critical loads and is connected through a relay to the utility, in parallel with the first panel section, to supply both utility power and renewable power when there is no outage. The relay is configured to isolate the second panel when there is a utility outage.

17 Claims, 2 Drawing Sheets

SPLIT-BUS ELECTRICAL PANEL IN PARALLEL CONFIGURATION TO MAXIMIZE PV/BATTERY INVERTER BACK-FEED POWER

TECHNICAL FIELD

The present disclosure relates to residential electrical panels for maximizing power of a photovoltaic system with battery back-up to power critical household loads during a utility power outage.

BACKGROUND

When an electrical utility outage occurs, critical loads such as pumps, security systems, refrigerators and electronics should ideally have an auxiliary source of power available. In residential applications, photovoltaic (PV) systems with battery back-up are available to provide limited auxiliary power, which is typically at a lower power level than is available from the utility. Thus, some means is required to allocate the reduced power to the critical loads. The installation of typical residential PV systems requires a separate back-up panel for the critical loads, so that the critical loads must be relocated to the separate back-up panel.

When adding an alternate energy source to an electrical system of a home, the National Electrical Code allows an extra 20% of electrical power to be added to a panel beyond its rating, provided the breaker feeding in this alternate energy is at the opposite end of the bus bar to the main breaker. A conventional 200 A rated panel, protected by a 200 A main breaker, may have up to 40 A of photovoltaic power added. Meanwhile a 225 A rated panel with a 200 A main breaker is allowed a photovoltaic back-feed of 70 A. For a pure photovoltaic installation this is often sufficient, but when a battery-based back-up system is added, this is sometimes not enough.

What is needed is a simplified, residential electrical panel for integration of a photovoltaic system with battery back-up to power critical household loads during a utility power outage, which enables connection to a far higher photovoltaic power source than allowed with conventional configurations.

SUMMARY

In accordance with one example embodiment described herein, an apparatus provides a single split-bus electrical panel with back-feed circuit breakers arranged and sized so that, for example, a single 225 A rated split-bus electrical panel with a 200 A main breaker may be used to connect a far higher photovoltaic power source than allowed with conventional configurations. Two sections of the single split bus electrical panel are connected in parallel, allowing much more photovoltaic power to be connected. For example, two 225 A panel sections of the split-bus panel each have a 110 A rated feed breaker. The panel section's rating may be increased by 120% of the 225 A to 270 A. The difference of the 270 A rating for the panel section from the 110 A rating for the breaker, allows a maximum rating of 160 A for photovoltaic power that may be connected to the panel section.

The back-feed circuit breakers are arranged to allow connection of a Microgrid Interconnection Device (MID) for isolation of a critical loads section from a standards loads section during back-up operation due to a utility power outage. The first panel section of the split-bus electrical panel is connected to a utility power source and supplies power to non-critical standards loads. The second panel section of the split-bus electrical panel is connected to a renewable power source with battery back-up to supply power to critical loads in a residence when there is a power outage. The second panel section is connected through a relay to the utility power source, in parallel with the first panel section, to supply both utility power and renewable power when there is no outage. The relay is configured to isolate the second panel when there is a utility power outage.

In accordance with one example embodiment described herein, apparatus for maximizing power of a photovoltaic system to power critical residential loads during a utility power outage, comprises:

a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;

a first circuit breaker in the first panel section connected to a first bus bar and a second bus bar of the first panel section, the first circuit breaker configured to conduct utility power from a utility power source;

a second circuit breaker in the second panel section connected to a first bus bar and a second bus bar of the second panel section, the second circuit breaker connected through a relay to the utility power source in parallel with the first circuit breaker, the second circuit breaker configured to conduct the utility power from the relay to the first bus bar and the second bus bar of the second panel section when there is no utility power outage, and to be isolated by the relay from the utility power source when there is a utility power outage;

a third circuit breaker in the second panel section connected to the first bus bar and the second bus bar of the second panel section, and connected to a renewable energy power source of the back-up system, configured to conduct renewable energy power to the first bus bar and the second bus bar of the second panel section; and a fourth circuit breaker in the second panel section connected to the first bus bar and the second bus bar of the second panel section, and connected to a back-up power source of the back-up system, configured to conduct back-up power to the first bus bar and the second bus bar of the second panel section to supplement the renewable energy power at least when a utility power outage is detected by the back-up power source.

In accordance with one example embodiment, the relay is configured to be closed and conduct utility power from the utility power source to the second circuit breaker when there is no utility power outage and to be open when there is a utility power outage.

In accordance with one example embodiment, an outage detector is associated with the back-up power source and is configured to detect whether there is a utility power outage and to send an outage signal to the relay to open when a utility power outage is detected.

In accordance with one example embodiment, the renewable energy power source of the back-up system is at least one of a photovoltaic solar array or a wind energy array.

In accordance with one example embodiment, the first, second, third, and fourth circuit breakers are two-pole circuit breakers operating as back-feed circuit breakers.

In accordance with one example embodiment, the utility power is 120/240 VAC Split Phase Electrical power.

In accordance with one example embodiment, the relay is a component of a microgrid interconnection device.

In accordance with one example embodiment, the first panel is connected through the relay in parallel with the second panel when there is no utility power outage.

In accordance with one example embodiment, the back-up power source of the back-up system includes a rechargeable battery, a charger, an inverter, and an outage detector that is configured to detect when there is a utility power outage and send an outage signal to the relay.

In accordance with one example embodiment, the back-up power source of the back-up system includes a rechargeable battery and a charger that receives the utility power from the fourth circuit breaker to charge the rechargeable battery when there is no utility power outage.

In accordance with one example embodiment, the first panel section and the second panel section are connected in parallel, and each panel section is fed and protected by its own feed breaker whose current rating is significantly below the bus rating of the panel section. This large difference between bus rating and feed breaker rating is what allows a large amount of solar capacity to be backfed to the panel section.

In accordance with one example embodiment, an outage detector is associated with a microgrid connection device and is configured to detect whether there is a utility power outage and to cause the relay to open when a utility power outage is detected.

In accordance with one example embodiment described herein, an apparatus for maximizing power of a photovoltaic system to power critical residential loads during a utility power outage, comprising:

a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;

a first circuit breaker in the first panel section connected to a first bus bar and a second bus bar of the first panel section, the first circuit breaker configured to conduct utility power from a utility power source;

a second circuit breaker in the second panel section connected to a first bus bar and a second bus bar of the second panel section, the second circuit breaker connected through a relay to the utility power source in parallel with the first circuit breaker, the second circuit breaker configured to conduct the utility power from the relay to the first bus bar and the second bus bar of the second panel section when there is no utility power outage, and to be isolated by the relay from the utility power source when there is a utility power outage;

a third circuit breaker in the second panel section connected to the first bus bar and the second bus bar of the second panel section, and connected to a renewable energy power source and a back-up power source of the back-up system, configured to conduct renewable energy power and back-up power to the first bus bar and the second bus bar of the second panel section, the back-up power to supplement the renewable energy power at least when a utility power outage is detected.

In accordance with one example embodiment, the first panel section and the second panel section are connected in parallel, and each panel section is fed and protected by its own feed breaker whose current rating is significantly below the bus rating of the panel section. This large difference between bus rating and feed breaker rating is what allows a large amount of solar capacity to be backfed to the panel section.

In accordance with one example embodiment, a system for maximizing power of a photovoltaic system to power critical residential loads during a utility power outage, comprises:

a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;

a first circuit breaker in the first panel section connected to a first bus bar and a second bus bar of the first panel section, the first circuit breaker configured to conduct utility power from a utility power source;

a relay connected to the utility power source, configured to be closed and conduct utility power from the utility power source when there is no utility power outage and to be open when there is a utility power outage;

a second circuit breaker in the second panel section connected to a first bus bar and a second bus bar of the second panel section, the second circuit breaker connected through the relay to the utility power source in parallel with the first circuit breaker, the second circuit breaker configured to conduct the utility power from the relay to the first bus bar and the second bus bar of the second panel section when there is no utility power outage, and to be isolated by the relay from the utility power source when there is a utility power outage;

a third circuit breaker in the second panel section connected to the first bus bar and the second bus bar of the second panel section, and connected to a renewable energy power source of the back-up system, configured to conduct renewable energy power to the first bus bar and the second bus bar of the second panel section;

a fourth circuit breaker in the second panel section connected to the first bus bar and the second bus bar of the second panel section, and connected to a back-up power source of the back-up system, configured to conduct back-up power to the first bus bar and the second bus bar of the second panel section to supplement the renewable energy power at least when a utility power outage is detected by the back-up power source; and an outage detector associated with the back-up power source, configured to detect whether there is a utility power outage and to send an outage signal to the relay to open when a utility power outage is detected.

The resulting apparatus and system connect the two panel sections of the split bus in parallel, allowing much more photovoltaic power to be connected. For example, two 225 Ampere panel sections of the split-bus panel each have a 110 Ampere rated breaker. The panel section's rating may be increased by 120% of the 225 Amperes to 270 Amperes. The difference of the 270 Ampere rating for the panel section from the 110 Ampere rating for the breaker, allows a maximum rating of 160 Amperes for photovoltaic power that may be connected to the panel section.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
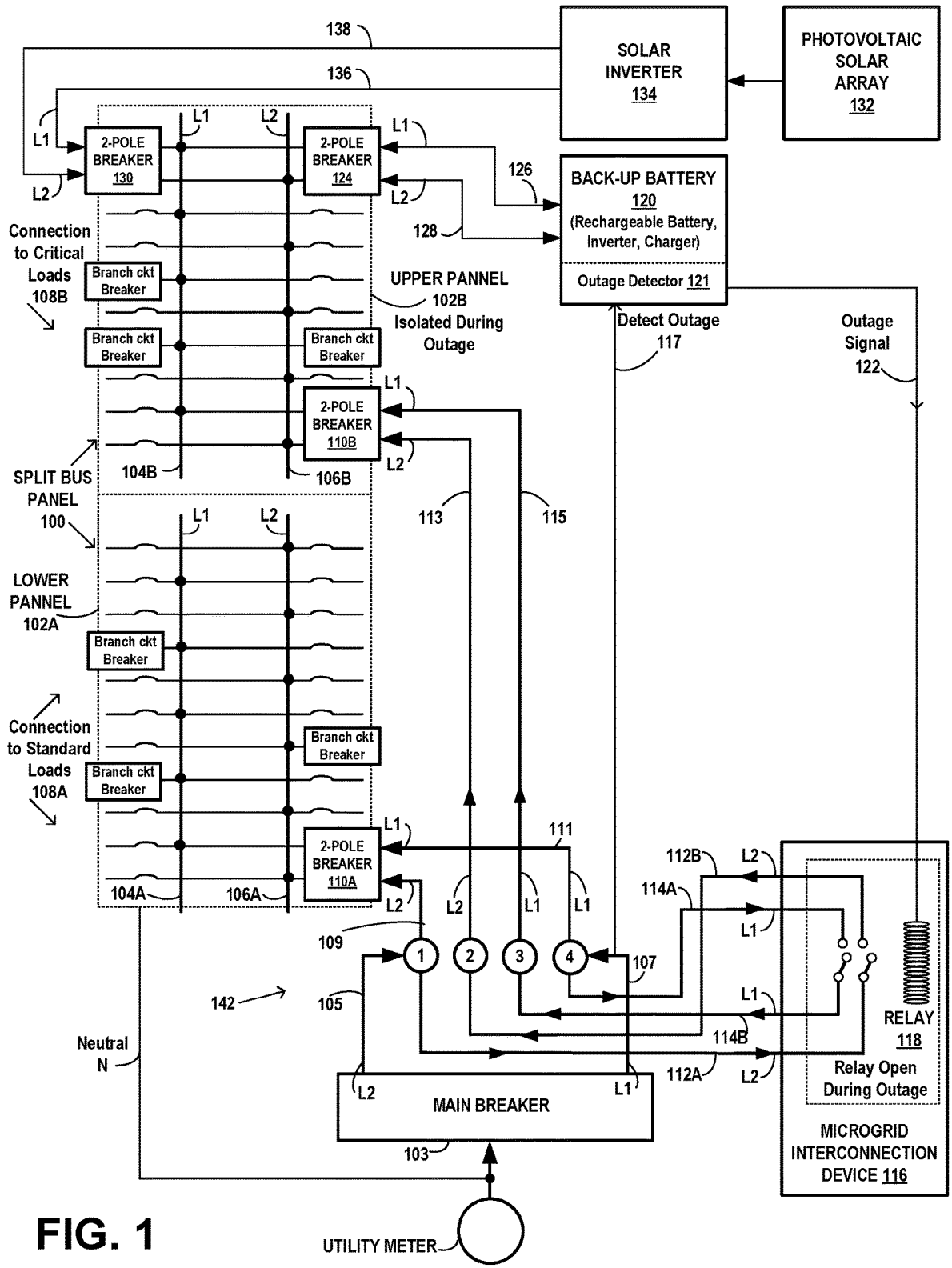
FIG. 1 is circuit and functional block diagram of a single split-bus electrical panel with back-feed circuit breakers arranged to allow connection of a Microgrid Interconnection Device (MID) for isolation of a critical loads section from a standards loads section during back-up operation due to a utility power outage, according to an example embodiment of the disclosure.

FIG. 1 illustrates an example of a single split-bus electrical panel 100 with back-feed circuit breakers 110A and 110B arranged to allow connection of a microgrid interconnection device (MID) 116 for isolation of a critical loads section 108B from a standard loads section 108A during a back-up operation due to a utility power outage. The single split-bus electrical panel apparatus 100 isolates critical electrical loads during a utility power outage, such as freezers, security systems, or electronic medical devices, to enable them to be powered by a renewable energy power source of a back-up system. The back-up system may be powered, for example, by at least one of a photovoltaic solar array 132 or a wind energy array. A first or lower panel section 102A of the split-bus electrical panel 100 supplies power to the non-critical standard loads 108A, such as general lighting, in a residence. A second or upper panel section 102B of the split-bus electrical panel 100 supplies power to the critical loads 108B in the residence, which must continue to be powered during a utility power outage.

In accordance with an example embodiment, a main incoming circuit breaker 103 is connected to an electric power utility that provides 120/240 VAC split phase electrical power for distribution by the split-bus electrical panel 100 to branch circuits of the residence. The utility supplies two 120 VAC phases L1 and L2 that are 180° out of phase with each other (split phases), and a grounded neutral voltage N. The main incoming circuit breaker 103 may be connected to the L1 leg and the L2 leg of the split-phase electrical power, and the grounded neutral voltage N may be connected to a neutral terminal of the split-bus electrical panel 100. The main incoming circuit breaker 103 may have an example rating of 200 Amperes.

The first 120 VAC phase L1 is between the L1 leg and the grounded neutral N, the phase L1 and is connected from the main breaker 103 via line 107 to a terminal 4 of a terminal block 142 of the split-bus electrical panel 100. The second 120 VAC phase L2 is between the L2 leg and the grounded Neutral N, the phase L2 and is connected from the main breaker 103 via line 105 to a terminal 1 of the terminal block 142. A 240 VAC service may be available between the Leg L1 and the Leg L2 of the split-phase electrical power.

A first two-pole circuit breaker 110A in the first panel section 102A may be oriented as a back feed breaker to connect the L1 bus bar 104A to terminal 4 of the terminal block 142 via line 111 and to phase L1 from the main circuit breaker 103 via line 107. The L2 bus bar 106A is connected to terminal 1 via line 109 and to phase L2 from the main circuit breaker 103 via line 105. The first two-pole circuit breaker 110A may have an example rating of 110 Amperes. The first bus bar 104A and the second bus bar 106A in the first panel section 102A, may each have an example bus bar rating of 225 Amperes.

A second two-pole circuit breaker 110B in the second panel section 102B may be oriented as a back feed breaker to connect the L1 bus bar 104B to terminal 3 of the terminal block 142 via line 115. The L2 bus bar 106B is connected to terminal 2 via line 113. The second two-pole circuit breaker 110B may have an example rating of 110 Amperes. The first bus bar 104B and the second bus bar 106B in the second panel section 102B, may each have an example bus bar rating of 225 Amperes. The National Electrical Code allows an extra 20% of electrical power to be added to a conventional 225 Ampere rated panel resulting in a total of 270 Amperes. Since the second circuit breaker 110B protecting this second panel section 102B is only 110 Amperes, a total of up to 160 Amperes of photovoltaic power may be connected to this second panel section 102B before reaching the maximum allowed.

The same calculations may be applied to the first panel section 102A, if it is desired to add more solar capacity, but that additional solar production would not be active when in backup mode.

A relay 118 in the microgrid interconnection device 116, is configured to be closed and conduct utility power from the main breaker 103 to the second two-pole circuit breaker 110B in the second panel section 102B when there is no utility power outage and to be open when there is a utility power outage.

When there is no outage, the closed relay 118 in the microgrid interconnection device 116 conducts the phase L1 power from the main breaker via line 107, terminal 4, lines 114A, 114B, terminal 3, and line 115 to the second two-pole breaker 110B in the second panel section 102B and the L1 bus bar 104B in the second panel section 102B. When there is no outage, the closed relay 118 in the microgrid interconnection device 116 conducts the phase L2 power from the main breaker via line 105, terminal 1, lines 112A, 112B, terminal 2, and line 113 to the second two-pole breaker 110B in the second panel section 102B and the L2 bus bar 106B in the second panel section 102B. The second panel 102B may thus be connected through the relay 118 to the main breaker 103, in parallel with the first panel 102A when there is no utility power outage.

The second panel section 102B of the split-bus electrical panel 100 services a back-up system that includes renewable energy power sources such as at least one of a photovoltaic (PV) system or a wind energy system. The photovoltaic (PV) system with a battery back-up, includes a photovoltaic solar array 132, a solar inverter 134, and a back-up battery 120. The back-up battery 120 includes a rechargeable battery, an inverter, a charger, and an outage detector 121. In normal operation when there is no outage of power from the utility, the photovoltaic system with battery back-up supplements the utility power.

The solar inverter 134 receives direct current from the photovoltaic solar array 132 and outputs alternating current over lines 136 and 138 to a third two-pole circuit breaker 130 in the second panel section 102B that may be oriented as a back feed breaker to connect the L1 bus bar 104B and the L2 bus bar 106B to the solar inverter 134. The third two-pole circuit breaker 130 may have an example rating of 60 Amperes. The solar inverter 134 outputs the AC power to the L1 bus bar 104B and the L2 bus bar 106B in the second panel section 102B via the third two-pole circuit breaker 130.

The back-up battery 120 includes an inverter that converts direct current from the rechargeable battery and outputs alternating current to a fourth two-pole circuit breaker 124 in the second panel section 102B that may be oriented as a back feed breaker to connect the L1 bus bar 104B and the L2 bus bar 106B to the inverter of the back-up battery 120. The fourth two-pole circuit breaker 124 may have an example rating of 30 Amperes. The inverter of the back-up battery 120 outputs the AC power over lines 126 and 128 to the fourth two-pole breaker 124 and the L1 bus bar 104B and the L2 bus bar 106B in the second panel section 102B, to supplement any insufficiency in photovoltaic power from the solar inverter 134, if needed. In addition, the back-up battery 120 includes a rechargeable battery and a charger that receives the utility power (or solar power) from the fourth circuit breaker 124 to charge the rechargeable battery when there is no utility power outage.

The backup battery 120 includes an outage detector 121 that may be connected to either the L1 phase or the L2 phase outputs 105 and 107 from the main circuit breaker 103. The outage detector 121 detects when the voltage changes in either or both of L1 phase and L2 phase outputs 105 and 107, indicating an outage of utility power. In response, the outage detector 121 of the back-up battery 120 sends an outage signal 122 to the relay 118 in the microgrid interconnection device 116, causing the relay 118 to open during the outage. When the relay 118 opens, the second panel section 102B may become isolated from the main breaker 103, so that the second panel 102B may be powered only from the solar inverter 134 and the back-up battery 120.

Branch circuit breakers may, for example, be plugged into either the first L1 bus bar 104A or the second L2 bus bar 104B of the first panel section 102A of the split-bus electrical panel 100, to supply power to various non-critical standard loads 108A of the residence. The first panel section 102A of the split-bus electrical panel 100 has an interleaved type of bus connector arrangement with two columns of branch circuit breakers. Each branch circuit breaker originates on the opposite phase (L1 or L2) from the one above or below it. The 120 VAC branch circuit loads are connected between a breaker on phase L1 bus bar 104A and Neutral N or between a breaker on Phase L2 bus bar 106A and Neutral N. The 240 V branch circuit loads may be connected using a first single-pole breaker on Phase L1 bus bar 104A and a second single-pole breaker Phase L2 bus bar 106A. The branch circuit breakers may have example ratings in a range of 15 to 90 Amperes.

In this manner, power may be supplied to the critical loads 108B connected to the second panel 102B, which must continue to be powered during a utility power outage.

When the utility power outage ends and utility power resumes, the outage detector 121 in the back-up battery 120 detects that the voltage has returned to one or both of the L1 phase and L2 phase outputs 105 and 107 of the main breaker 103, indicating that the outage of utility power has ended. In response, the outage detector 121 of the back-up battery 120 sends a signal that the outage has ended, to the relay 118 in the microgrid interconnection device 116, causing the relay 118 to close. When the relay 118 closes, the second panel section 102B may be reconnected to main breaker 103, so that it may be powered by the utility power, as well as being powered by the supplementary power from the solar inverter 134 and the back-up battery 120.

Figure 2:
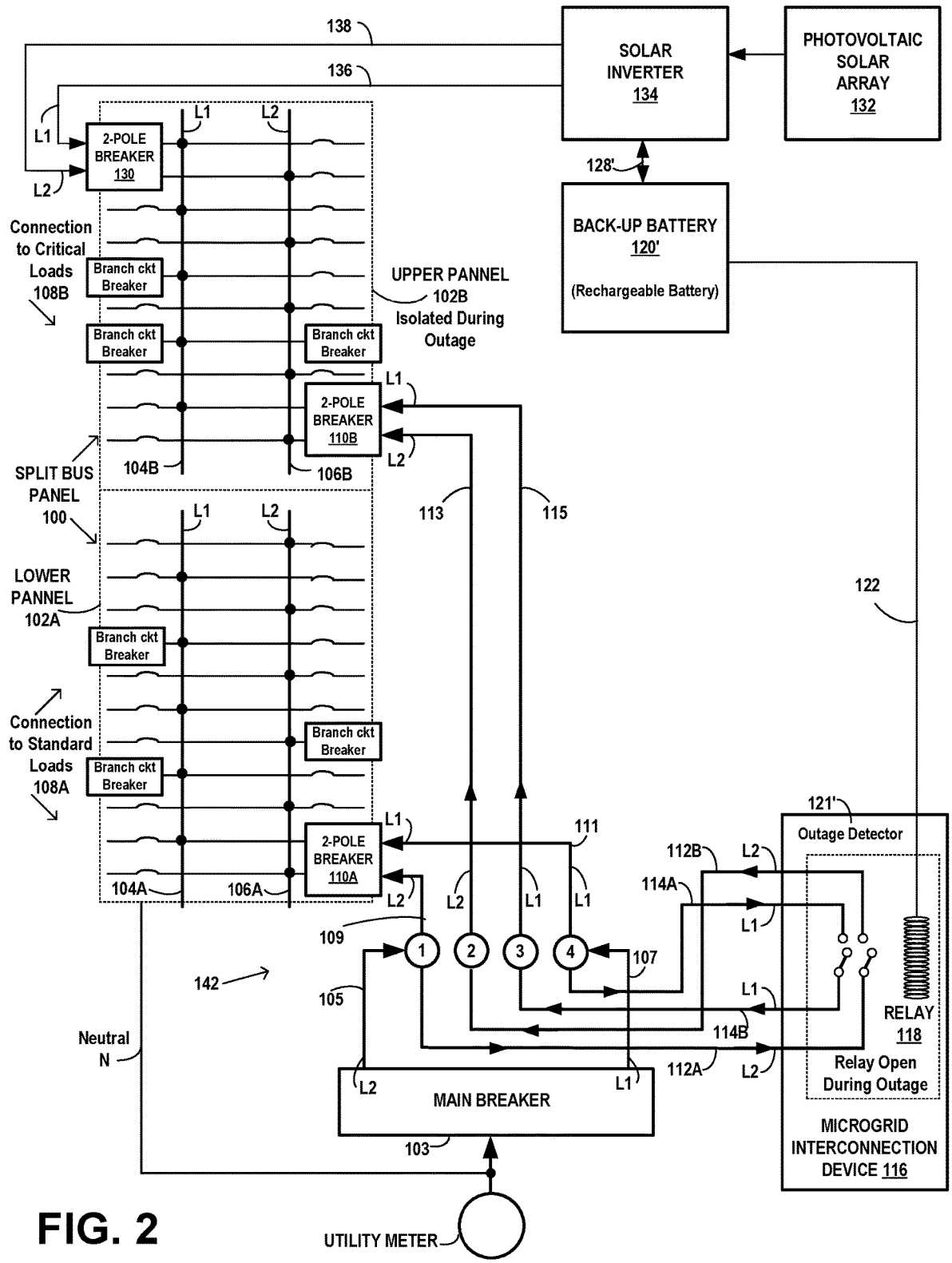
FIG. 2 is circuit and functional block diagram of an alternate example embodiment of the single split-bus electrical panel of FIG. 1, wherein the back-up battery provides back-up direct current to the solar inverter, which is combined with the photoelectric direct current from the photovoltaic solar array, the combined currents being converted by the solar inverter to alternating current that is provided to the third circuit breaker, according to another example embodiment of the disclosure.

FIG. 2 is circuit and functional block diagram of an alternate example embodiment of the single split-bus electrical panel 100 of FIG. 1, wherein the back-up battery 120' provides back-up direct current over line 128' to the solar inverter 134, which is combined with the photoelectric direct current from the photovoltaic solar array 132. The combined currents are converted by the solar inverter 134 to alternating current that is provided over lines 136 and 138 to the third circuit breaker 130. FIG. 2 also illustrates an alternate example wherein the outage detector 121' is associated with the microgrid connection device 116. The outage detector 121' is configured to detect whether there is a utility power outage and to cause the relay 118 to open when a utility power outage is detected. Battery power is available over line 122 to operate the relay 118 during a utility power outage.

The resulting apparatus, system, and method provide a single split-bus electrical panel with back-feed circuit breakers arranged and sized so that, for example, a single 225 A rated split-bus electrical panel with a 200 A main breaker may be used to connect a far higher photovoltaic power source than allowed with conventional configurations. Two panel sections of the single split bus electrical are connected in parallel, allowing much more photovoltaic power to be connected. For example, two 225 Ampere panel sections of the split-bus panel each have a 110 Ampere rated breaker. The panel section's rating may be increased by 120% of the 225 Amperes to 270 Amperes. The difference of the 270 Ampere rating for the panel section from the 110 Ampere rating for the breaker, allows a maximum rating of 160 Amperes for photovoltaic power that may be connected to the panel section.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus for maximizing power of a photovoltaic system to power critical residential loads during a utility power outage, comprising:
   a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;
   a first circuit breaker in the first panel section connected to a first bus bar and a second bus bar of the first panel section, the first circuit breaker configured to conduct utility power from a utility power source;
   a second circuit breaker in the second panel section connected to a first bus bar and a second bus bar of the second panel section, the second circuit breaker connected through a relay to the utility power source in parallel with the first circuit breaker, the second circuit breaker configured to conduct the utility power from the relay to the first bus bar and the second bus bar of the second panel section when there is no utility power outage, and to be isolated by the relay from the utility power source when there is a utility power outage;
   a third circuit breaker in the second panel section connected to the first bus bar and the second bus bar of the second panel section, and connected to a renewable energy power source of the back-up system, configured to conduct renewable energy power to the first bus bar and the second bus bar of the second panel section; and
   a fourth circuit breaker in the second panel section connected to the first bus bar and the second bus bar of the second panel section, and connected to a back-up power source of the back-up system, configured to conduct back-up power to the first bus bar and the second bus bar of the second panel section to supplement the renewable energy power at least when a utility power outage is detected by the back-up power source.

2. The apparatus of claim 1, wherein the relay is configured to be closed and conduct utility power from the utility power source to the second circuit breaker when there is no utility power outage and to be open when there is a utility power outage.

3. The apparatus of claim 2, wherein an outage detector is associated with the back-up power source and is configured to detect whether there is a utility power outage and to send an outage signal to the relay to open when a utility power outage is detected.

4. The apparatus of claim 1, wherein the renewable energy power source of the back-up system is at least one of a photovoltaic solar array or a wind energy array.

5. The apparatus of claim 1, wherein the first, second, third, and fourth circuit breakers are two-pole circuit breakers operating as back-feed circuit breakers.

6. The apparatus of claim 1, wherein the utility power is 120/240 VAC Split Phase Electrical power.

7. The apparatus of claim 1, wherein the relay is a component of a microgrid interconnection device.

8. The apparatus of claim 1, wherein the second panel is connected through the relay to the utility power source in parallel with the first panel when there is no utility power outage.

9. The apparatus of claim 1, wherein the back-up power source of the back-up system includes a rechargeable battery, a charger, an inverter, and an outage detector that is configured to detect when there is a utility power outage and send an outage signal to the relay.

10. The apparatus of claim 1, wherein the back-up power source of the back-up system includes a rechargeable battery and a charger that receives the utility power from the fourth circuit breaker to charge the rechargeable battery when there is no utility power outage.

11. The apparatus of claim 2, wherein an outage detector is associated with a microgrid connection device and is configured to detect whether there is a utility power outage and to cause the relay to open when a utility power outage is detected.

12. A system for maximizing power of a photovoltaic system to power critical residential loads during a utility power outage, comprising:
   a single, split-bus electrical panel including a first panel section of the split-bus electrical panel configured to supply power to non-critical standard electrical loads and a second panel section of the split-bus electrical panel configured to supply power to critical electrical loads by a back-up system, the critical loads required to be powered during a utility power outage;
   a first circuit breaker in the first panel section connected to a first bus bar and a second bus bar of the first panel section, the first circuit breaker configured to conduct utility power from a utility power source;
   a relay connected to the utility power source, configured to be closed and conduct utility power from the utility power source when there is no utility power outage and to be open when there is a utility power outage;
   a second circuit breaker in the second panel section connected to a first bus bar and a second bus bar of the second panel section, the second circuit breaker connected through the relay to the utility power source in parallel with the first circuit breaker, the second circuit breaker configured to conduct the utility power from the relay to the first bus bar and the second bus bar of the second panel section when there is no utility power outage, and to be isolated by the relay from the utility power source when there is a utility power outage;
   a third circuit breaker in the second panel section connected to the first bus bar and the second bus bar of the second panel section, and connected to a renewable energy power source of the back-up system, configured to conduct renewable energy power to the first bus bar and the second bus bar of the second panel section;
   a fourth circuit breaker in the second panel section connected to the first bus bar and the second bus bar of the second panel section, and connected to a back-up power source of the back-up system, configured to conduct back-up power to the first bus bar and the second bus bar of the second panel section to supplement the renewable energy power at least when a utility power outage is detected by the back-up power source; and
   an outage detector associated with the back-up power source, configured to detect whether there is a utility power outage and to send an outage signal to the relay to open when a utility power outage is detected.

13. The system of claim 12, wherein the renewable energy power source of the back-up system is at least one of a photovoltaic solar array or a wind energy array.

14. The system of claim 12, wherein the first, second, third, and fourth circuit breakers are two-pole circuit breakers operating as back-feed circuit breakers.

15. The system of claim 12, wherein the relay is a component of a microgrid interconnection device.

16. The system of claim 12, wherein the second panel is connected through the relay to the utility power source in parallel with the first panel when there is no utility power outage.

17. The system of claim 12, wherein the back-up power source of the back-up system includes a rechargeable battery, a charger, an inverter, and the outage detector.

* * * * *